US011549612B1

(12) United States Patent
Jones et al.

(10) Patent No.: US 11,549,612 B1
(45) Date of Patent: Jan. 10, 2023

(54) VALVE CORE REMOVAL TOOL FIXTURE WITH SLIDE VALVE

(71) Applicant: Anderson Brass Company, Hartsville, SC (US)

(72) Inventors: Eric Scott Jones, Camden, SC (US); Dave Madden, Big Rock, IL (US)

(73) Assignee: Anderson Brass Company, Hartsville, SC (US)

( * ) Notice: Subject to any disclaimer, the term of this patent is extended or adjusted under 35 U.S.C. 154(b) by 0 days.

(21) Appl. No.: 17/668,837

(22) Filed: Feb. 10, 2022

Related U.S. Application Data

(60) Provisional application No. 63/150,172, filed on Feb. 17, 2021, provisional application No. 63/148,697, filed on Feb. 12, 2021.

(51) Int. Cl.
*F16K 43/00* (2006.01)

(52) U.S. Cl.
CPC .................................. *F16K 43/001* (2013.01)

(58) Field of Classification Search
CPC ..................................................... F16K 43/001
See application file for complete search history.

(56) References Cited

U.S. PATENT DOCUMENTS

| | | | | |
|---|---|---|---|---|
| 2,517,870 A * | 8/1950 | Gump | ...................... | E21B 34/02 166/85.1 |
| 3,718,057 A | 2/1973 | Berchtold | | |
| 3,935,713 A * | 2/1976 | Olson | ...................... | B25B 27/24 62/77 |
| 4,599,776 A * | 7/1986 | Haggard | ................. | B25B 13/48 81/55 |
| 4,706,357 A * | 11/1987 | Ewing | ...................... | B25B 27/24 29/213.1 |
| 5,228,178 A * | 7/1993 | Stickley | ................ | F16K 43/003 29/213.1 |
| 6,253,436 B1 | 7/2001 | Barjesteh et al. | | |
| 6,253,439 B1 * | 7/2001 | Niehwohner | .......... | B62D 65/06 29/509 |
| 6,296,228 B1 * | 10/2001 | Knowles | ................ | F25B 41/40 251/149.6 |
| 6,901,947 B2 * | 6/2005 | Danielson | ............... | F16L 37/23 29/221.6 |
| 7,559,245 B2 | 7/2009 | Knowles et al. | | |
| 8,899,254 B1 * | 12/2014 | Weiler | ..................... | F16L 41/06 81/53.2 |
| 9,278,439 B1 * | 3/2016 | Krause | ..................... | B25B 27/24 |
| 9,943,951 B2 * | 4/2018 | Munguia | ................. | B25B 27/24 |
| 10,478,953 B2 * | 11/2019 | Green | ..................... | B25B 27/24 |
| 10,760,737 B2 | 9/2020 | Green | | |

* cited by examiner

*Primary Examiner* — Kevin R Barss
(74) *Attorney, Agent, or Firm* — Dority & Manning, P.A.

(57) ABSTRACT

A docking fixture for removal of a valve core from a valve fitting of a pressurized system includes a main body defining a hollow main channel that receives a gripping probe to remove the core of a charging valve that is part of a pressurized HVAC system. The docking fixture has a proximal end that can be connected to the HVAC fitting that houses the valve core that is to be removed and replaced. The docking fixture has a side port integrated with a slide valve that can be closed to isolate and protect a sensitive vacuum pressure gauge that might be connected to the free end the fixture's side port. The slide valve includes a sleeve and a tactile feedback mechanism that is configured to provide tactile sensation when the sleeve is positioned in one of the open position and the closed position of the slide valve.

16 Claims, 11 Drawing Sheets

VALVE CORE REMOVAL TOOL FIXTURE WITH SLIDE VALVE

CROSS-REFERENCE TO RELATED APPLICATIONS

The present application claims the benefit of U.S. Provisional Application No. 63/148,697, filed Feb. 12, 2021, and U.S. Provisional Application No. 63/150,172, filed Feb. 17, 2021.

STATEMENT REGARDING FEDERALLY SPONSORED RESEARCH OR DEVELOPMENT

Not applicable.

FIELD OF THE INVENTION

The subject matter disclosed herein generally involves apparatus for removing and installing a valve core from a sealed system that is not at atmospheric pressure.

BACKGROUND OF THE INVENTION

HVAC units that are charged with environmentally harmful refrigerants are maintained at pressures that differ from the atmospheric pressure that surrounds the HVAC unit. These HVAC units include a fitting through which the HVAC unit is charged with refrigerant and alternatively evacuated of refrigerant. An example of this HVAC fitting is designated 44 in FIG. 6 of U.S. Pat. No. 7,559,245 to Knowles et al, which is hereby incorporated herein by this reference for all purposes. Each such fitting typically is fitted with a valve, which includes a valve core (designated 74 in FIG. 7 of Knowles et al) that is biased to close the port. However, due to aging or damage, this valve core periodically must be removed from the fitting and replaced with a new valve core. Knowles et al discloses an example of a valve core removal tool (designated 31 in FIG. 7 of Knowles et al) that is configured for removing a valve core from the fitting of an HVAC unit. Due to the potential harmful effects of the refrigerants to humans, leakage of the harmful refrigerants from the HVAC unit into the surrounding atmosphere must be prevented during the process of removal and replacement of the valve core.

Moreover, a subassembly (designated 30 in FIG. 6 of Knowles et al) of the valve removal fixture 31 typically includes a male fitting (designated 43 in FIG. 6 of Knowles et al) that can be connected to a vacuum gauge (designated 1 in FIGS. 1-3 of Knowles et al) that indicates the pressure within the HVAC unit. However, such vacuum gauges can be damaged if exposed to pressure above atmospheric pressure, which can occur during charging of the HVAC unit with refrigerant or if the HVAC unit contains refrigerant under pressure. Additionally, as shown in FIG. 10, operation of the valve removal fixture 31 requires the use of both hands of the operator. The forefinger 71 and thumb 72 of one hand supports the subassembly 30, while the forefinger 81 and thumb 72 of the operator's other hand rotates the handle 54b of the ball valve.

Various apparatus and methods for replacing the valve cores in these HVAC units heretofore have been used. Each of U.S. Pat. No. 3,718,057 to Berchtold, which is hereby incorporated herein by this reference for all purposes, and U.S. Pat. No. 6,253,436 to Barjesteh, which is hereby incorporated herein by this reference for all purposes, discloses its own example of a valve core removal tool for removing a valve core from a pressurized system. U.S. Pat. No. 10,478,953 to Green, which is hereby incorporated herein by this reference for all purposes, discloses still another example of a valve core removal tool.

Due to the variety of different configurations for such valve core structures, the valve core removal tool must be configured so as to accommodate such different valve core structures in a way that secures against leaks of the refrigerant into the environment. Moreover, this must be done while safeguarding any vacuum gauge from damage during the various procedures that must be performed. Having personnel on hand who are sufficiently competent to manipulate the valve core removal tool in a way that secures against leaks of the refrigerant into the environment and/or damage to the vacuum gauge poses problems. Less competent personnel take longer to engage and remove the defective valve core and install the replacement valve core. Such delays add additional cost to the performance of these tasks. However, until this secure placement has been effected, workers should not be permitted access to the HVAC system. Accordingly, a need exists for apparatus that addresses these issues.

BRIEF DESCRIPTION OF THE DRAWINGS

Aspects and advantages of the invention are set forth below in the following description, or may be obvious from the description, or may be learned through practice of embodiments of the invention. Those of ordinary skill in the art will better appreciate the features and aspects of such embodiments, and others, upon review of the specification. A full and enabling disclosure of the present invention, including the best mode thereof to one skilled in the art, is set forth more particularly in this specification, including reference to the accompanying figures, in which.

Figure 1:
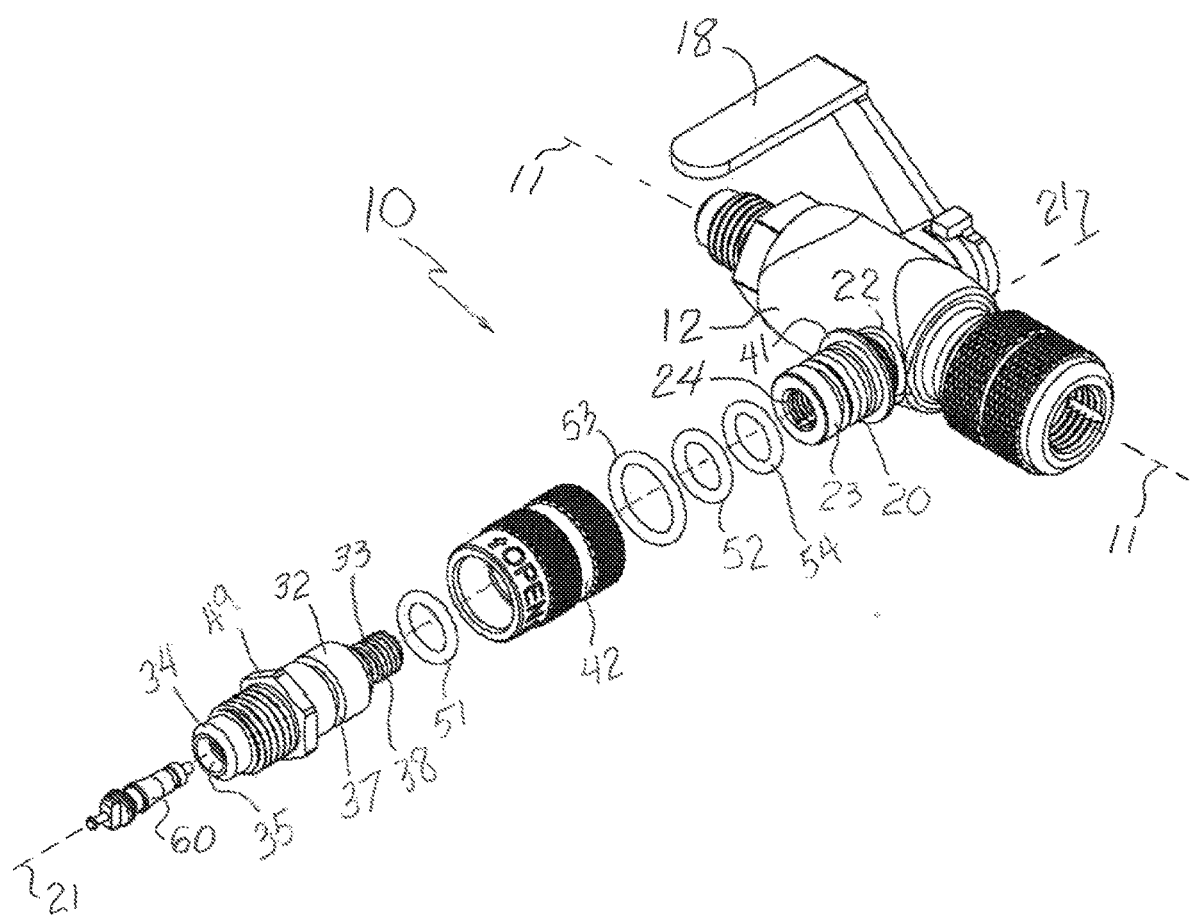
FIG. 1 is an exploded perspective view that schematically illustrates disassembled components of a docking fixture for a core valve removal tool for removal of a valve core in accordance with a presently preferred embodiment of the present invention.

The accompanying drawings, which are incorporated in and constitute a part of this specification, illustrate at least one presently preferred embodiment of the invention as well as some alternative embodiments. These drawings, together with the written description, explain the principles of the invention but by no means are intended to be exhaustive of every possible embodiment of the invention.

DETAILED DESCRIPTION OF EXEMPLARY EMBODIMENTS OF THE INVENTION

Briefly, the apparatus of the present invention is a docking fixture that is a subassembly used in combination with a gripping probe to remove the core of a charging valve that is part of an HVAC system that contains a refrigerant such as Freon maintained under about 800 psi of pressure. The docking fixture is configured with a proximal end that can be connected to the HVAC fitting that houses the valve core that is to be removed and replaced. In accordance with the present invention, the docking fixture desirably includes a slide valve 50 (FIG. 3 and FIG. 4) that can be closed to isolate and protect a sensitive vacuum pressure gauge that might be connected to the free end 34 of the fixture's side port 20 and that is configured for indicating when the HVAC system has been completely evacuated of the refrigerant. Reference will now be made in detail to present exemplary embodiments of the invention, wherein one or more examples of which are illustrated in the accompanying drawings. The detailed description uses numerical and/or letter designations to refer to features in the drawings. Like or similar designations in the drawings and description have been used to refer to like or similar parts of the embodiments of the invention.

Each example is provided by way of explanation of the invention, not limitation of the invention. In fact, it will be apparent to those skilled in the art that modifications and variations can be made in the present invention without departing from the scope or spirit thereof. For instance, features illustrated or described as part of one embodiment may be used on another embodiment to yield a still further embodiment. Thus, it is intended that the present invention covers such modifications and variations as come within the scope of the appended claims and their equivalents.

It is to be understood that the ranges and limits mentioned herein include all sub-ranges located within the prescribed limits, inclusive of the limits themselves unless otherwise stated. For instance, a range from 100 to 1200 also includes all possible sub-ranges, examples of which are from 100 to 150, 170 to 190, 153 to 162, 145.3 to 149.6, and 187 to 1200. Further, a limit of up to 7 also includes a limit of up to 5, up to 3, and up to 4.5, as well as all sub-ranges within the limit, such as from about 0 to 5, which includes 0 and includes 5 and from 5.2 to 7, which includes 5.2 and includes 7.

Figure 2:
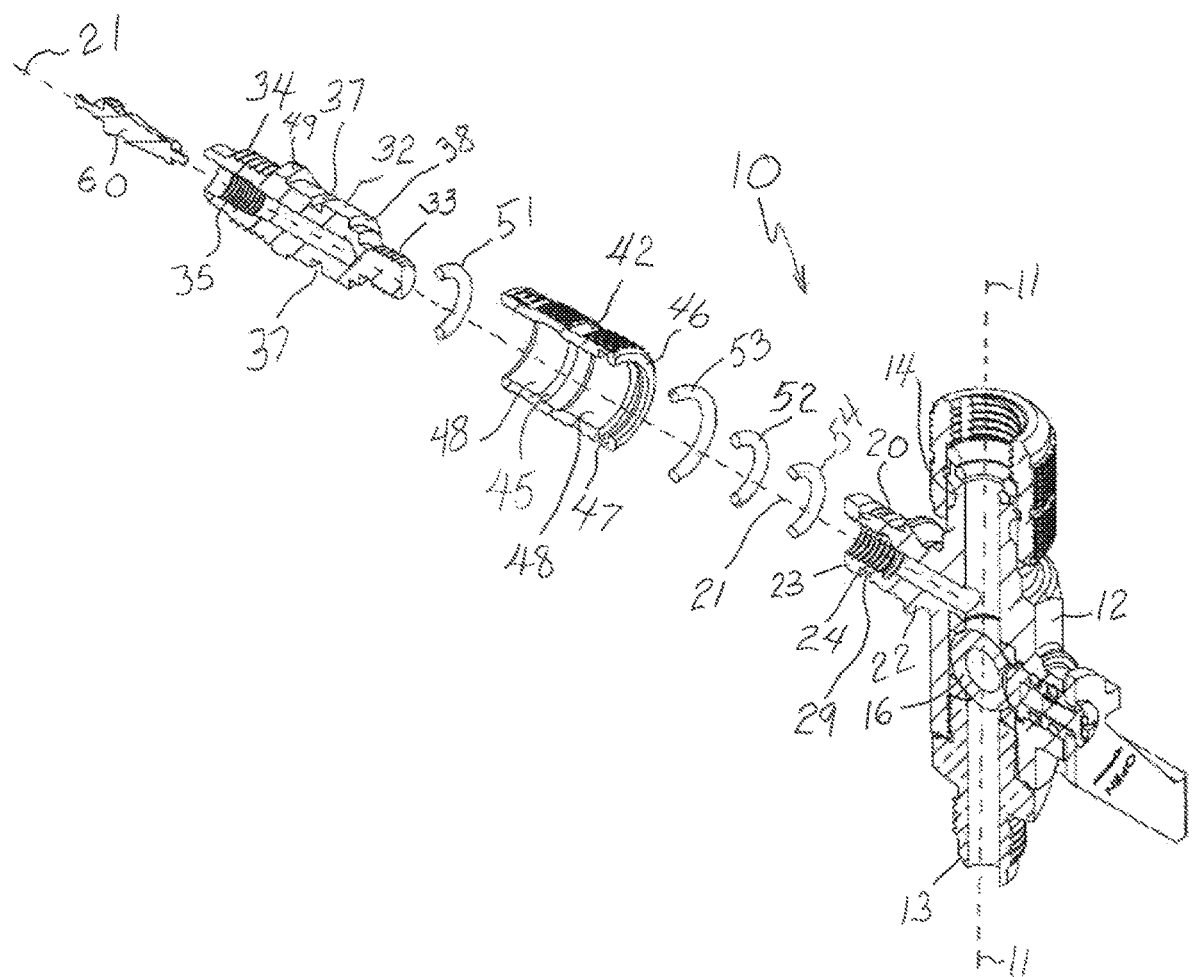
FIG. 2 is an exploded partial perspective view and cross-sectional view taken through the docking fixture in the plane defined by the longitudinal and transverse axes.

FIG. 1 is an elevated perspective view that schematically illustrates disassembled components of a docking fixture for a valve core removal tool for removal of a valve core in accordance with a presently preferred embodiment of the present invention. The docking fixture is generally designated by the numeral 10. As shown in FIG. 1, the docking fixture 10 includes a main body 12, a side port 20, a retainer 32, a sleeve 42 and a valve core 60 of a check valve in fluid communication with the side port 20. FIG. 2 provides an exploded cross-sectional view of some of the components identified in FIG. 1 taken in a plane defined by a longitudinal axis 11 that runs through the center of the main body 12 and a transverse axis 21 that runs through the center of the side port 20, retainer 32, sleeve 42 and valve core 60.

Figure 8:
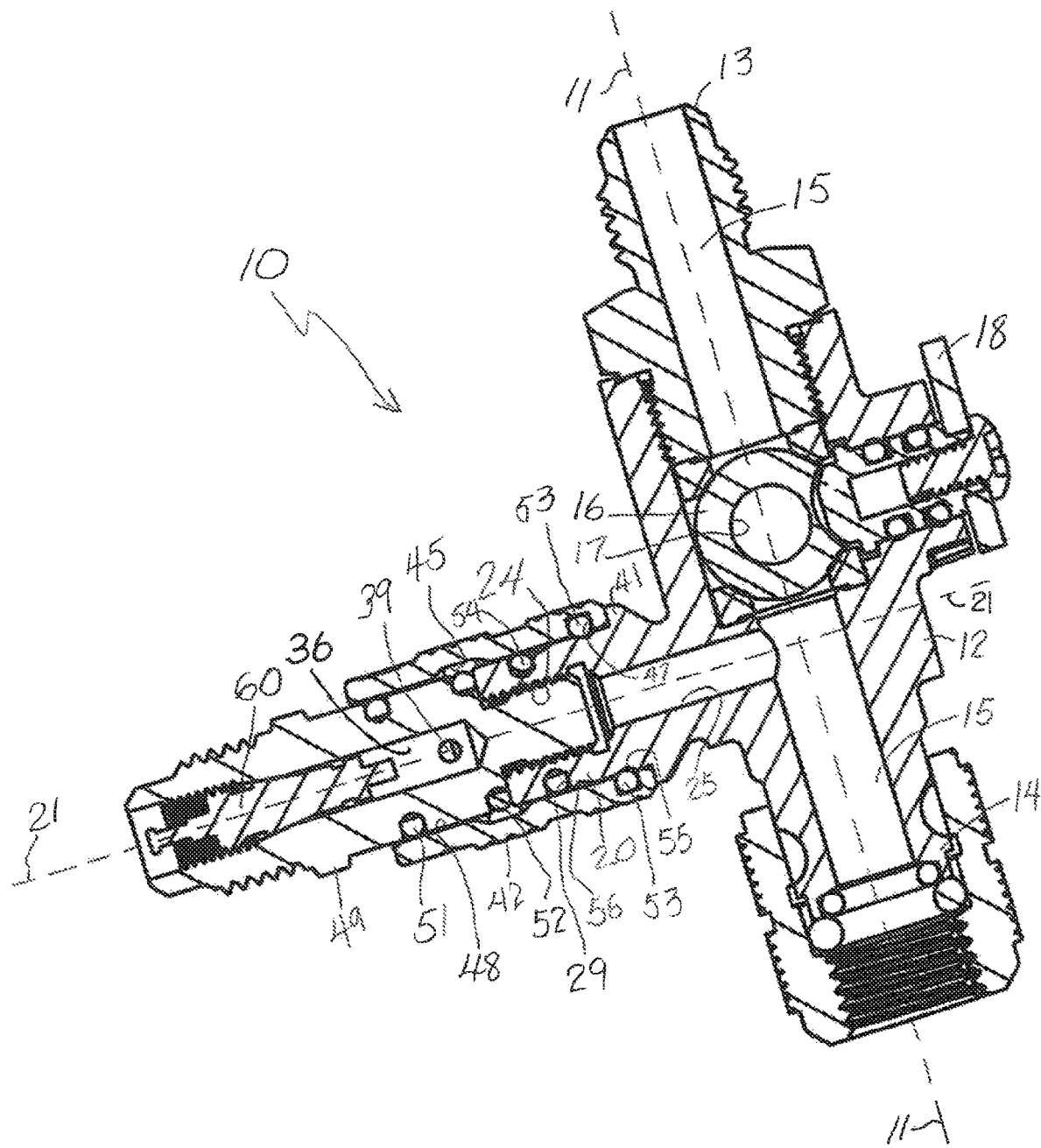
FIG. 8 is a cross-sectional view taken through the entire docking fixture in the plane defined by the longitudinal and transverse axes.

As shown in FIG. 2 and FIG. 8, the main body 12 is hollow and elongates along the longitudinal axis 11 between a front end 13 and a rear end 14, which is spaced apart from the front end 13 in the direction of the longitudinal axis 11. As shown in FIG. 8, the main body 12 internally defines a main channel 15 that elongates about the longitudinal axis 11. The main channel 15 desirably elongates in a straight line around the longitudinal axis 11 and is symmetrically cylindrical in shape in the presently preferred embodiment.

The main body 12 of the docking fixture 10 houses an isolation valve that is disposed between the front end 13 and the rear end 14 of the main body 12 and controls fluid communication between the two ends 13, 14 so that the front end 13 can be selectively isolated from the rear end and vice versa. When the isolation valve is closed, fluid is prevented from traveling between the two opposite ends 13, 14 of the main body 12. As shown in FIG. 2 and FIG. 8, the isolation valve includes a ball 16 that is rotatably mounted internally of the main body 12, and a through conduit 17 is defined axially through the ball 16. Manual rotation of the ball 16 via the handle 18 can move the conduit selectively between an alignment with the main channel 15 (the open position) and ninety degrees out of alignment with the main channel 15 (the closed position).

The docking fixture 10 is configured to receive an insertion shaft (not shown), which is a tool that is used to screw a valve core (not shown) into an HVAC valve (not shown) or alternately unscrew the valve core from the HVAC valve. An example of an insertion shaft 62 can be seen in U.S. Pat. No. 7,559,245 to Knowles et al. The insertion shaft desirably is formed in a conventional manner as a rigid rod, which typically is made of steel. The insertion shaft elongates along a central longitudinal axis 11 when inserted into the main channel 15 of the main body 12. The insertion shaft passes through the conduit 17 in the ball 16 of the isolation valve to gain access to the valve core that is to be installed or removed, as required during maintenance of the HVAC system.

As shown in FIG. 1 and FIG. 2, a handle 18 is rotatably mounted to the exterior of the main body 12. The handle 18 is non-rotatably connected to the ball 16 of the isolation valve so that rotation of the handle 18 effects rotation of the ball 16 to dispose the conduit 17 between an open condition of the main channel 15 and a closed condition of the main channel 15. In the open condition, the main channel 15 permits unimpeded fluid communication between the front end 13 and the rear end 14 of the main body 12. Thus, in the open condition, the insertion shaft can be inserted into the main channel 15 from the rear end 14 of the main body 12 and moved through the conduit 17 in the ball 16 to reach the front end 13 of the main body 12.

In use, the front end 13 of the main body 12 would be connected to a fitting of a conventional HVAC system through which the refrigerant fluid is supplied under pressure to the HVAC system. The fitting internally contains the valve core of the HVAC valve, and the valve core of the HVAC valve becomes accessible from the front end 13 of the main body 12. In the closed condition of the main channel 15, the isolation valve prevents communication between the front end 13 and the rear end 14 of the main body 12 and denies communication between the HVAC valve and the rear end 14 of the main body 12 via the main channel 15.

Figure 3:
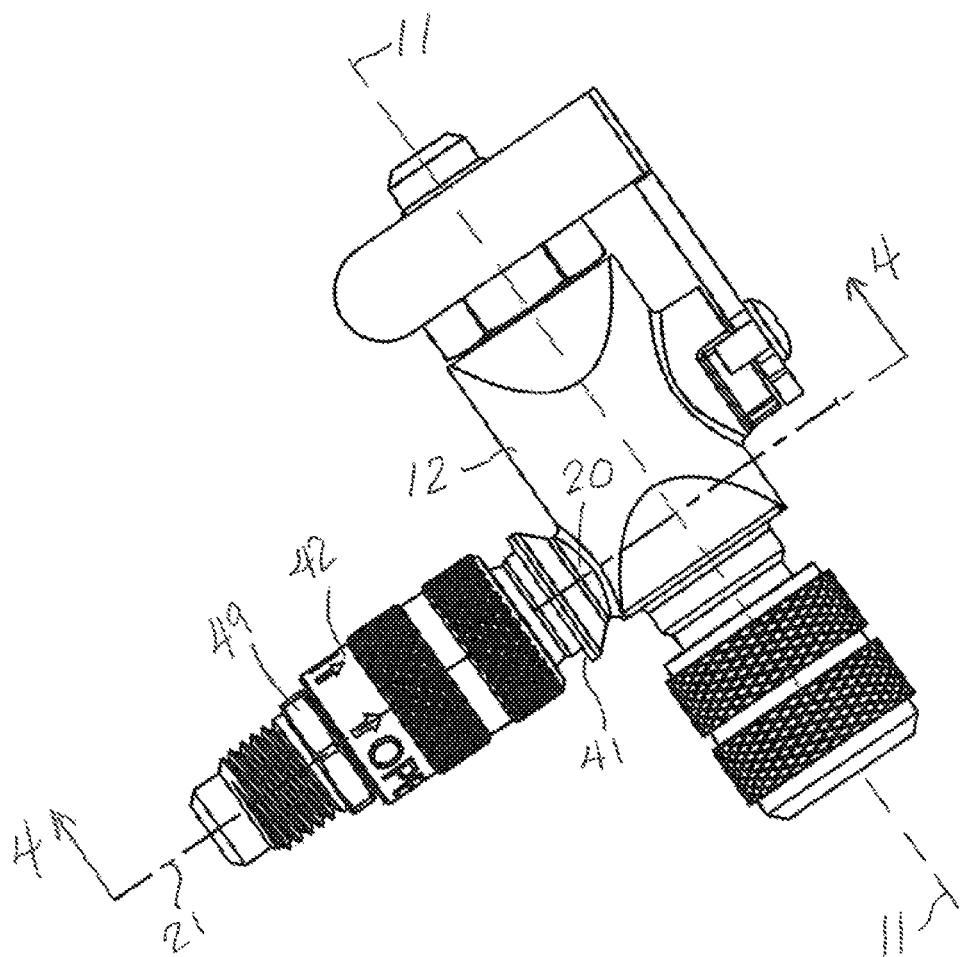
FIG. 3 is a top plan elevation view of the assembled embodiment of the docking fixture of the present invention shown in FIG. 1.
Figure 4:
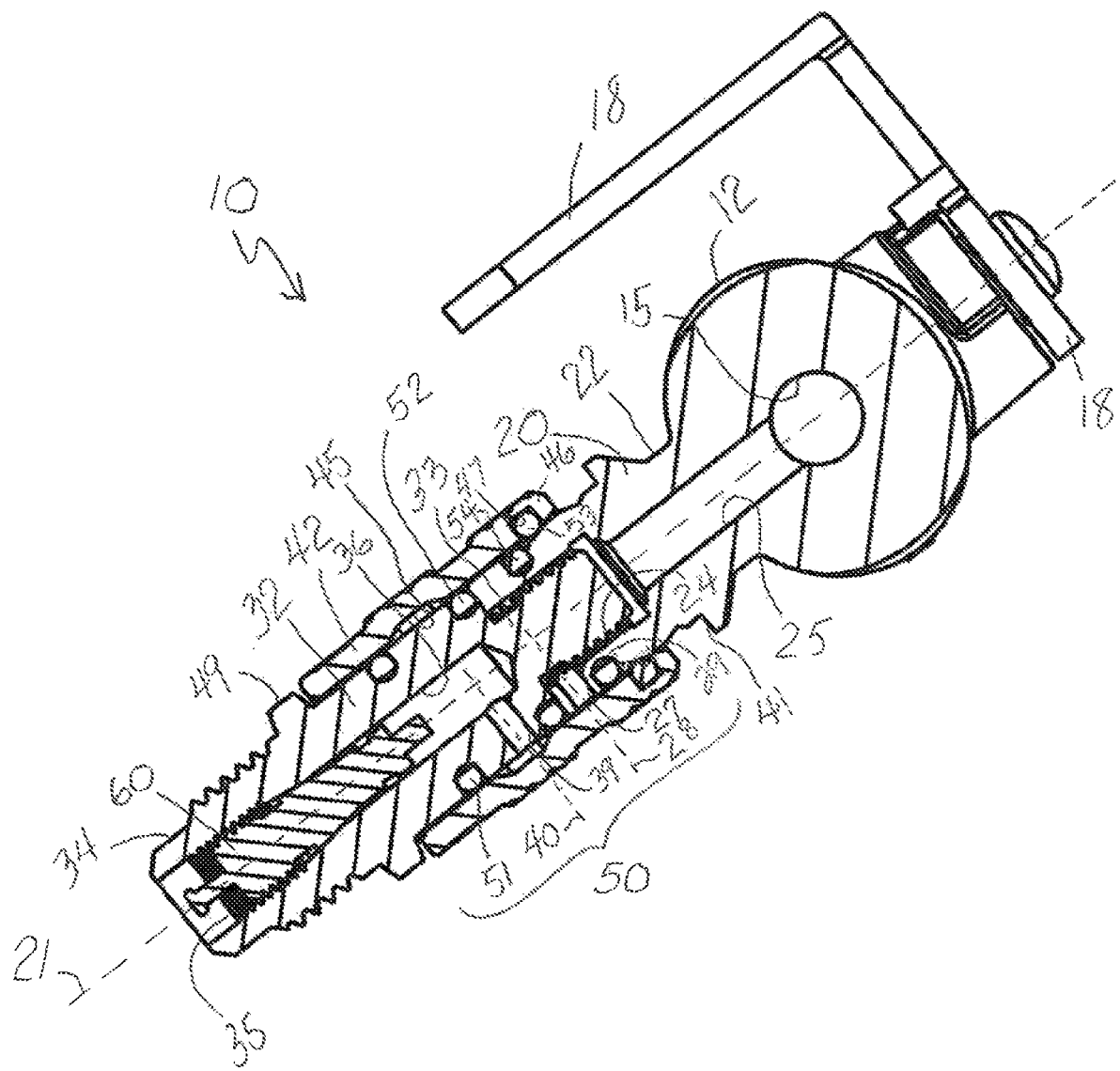
FIG. 4 is a cross-sectional view of the docking fixture taken along the transverse axis in the direction indicated by the arrows designated 4-4 in FIG. 3 and with the slide valve in the closed position.
Figure 5:
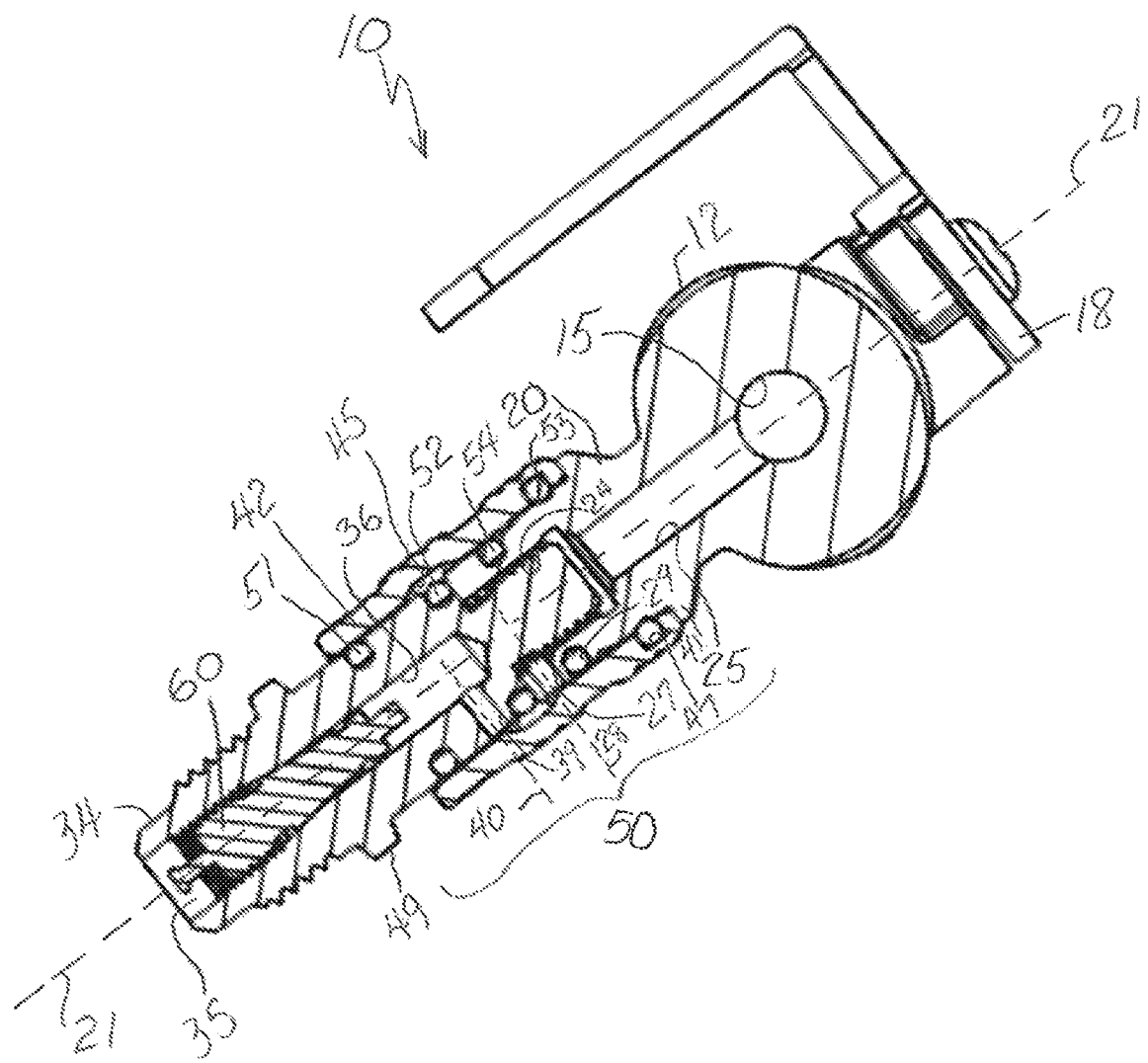
FIG. 5 is a cross-sectional view of the docking fixture taken along the transverse axis in the direction indicated by the arrows designated 4-4 in FIG. 3 and with the slide valve in the open position.
Figure 6:
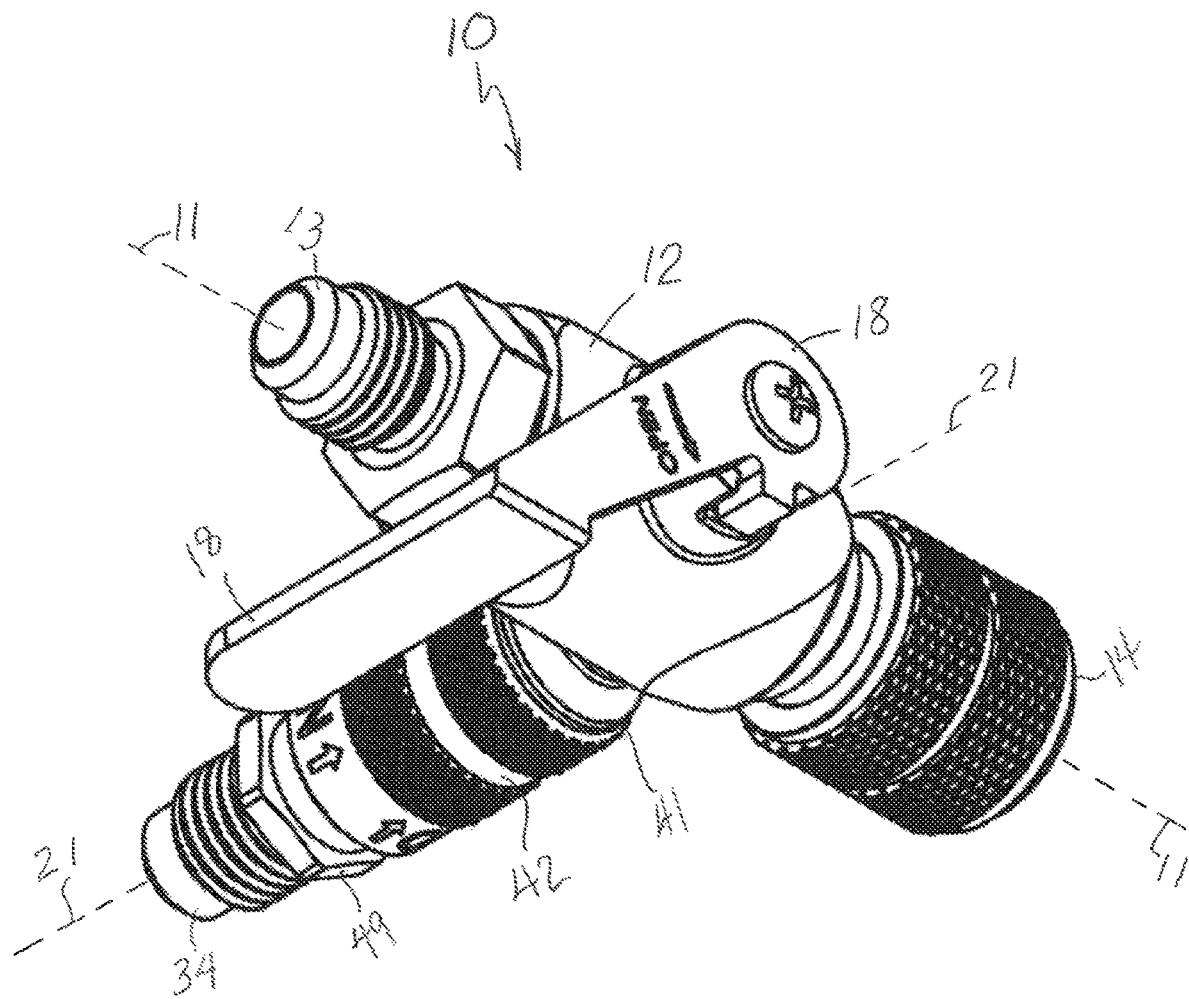
FIG. 6 is an elevated perspective view of an assembled embodiment of the present docking fixture with slide valve disposed for operation to remove a valve core and looking at the end of the docking fixture that is the end that is configured to be connected to the valve from which the valve core is to be removed and/or installed.

As schematically shown in FIG. 4 and FIG. 5, the docking fixture has 10 a side port 20 that communicates with the main channel 15 through which the insertion shaft would be inserted. As shown in FIG. 3 and FIG. 8, the side port 20 desirably is formed integrally with the main body 12. As shown in FIG. 2, the side port 20 defines a proximal end 22 that is connected against the main body 12 and thus is proximate to the main body 12. The side port 20 extends from the main body 12 at a location that is disposed between the isolation valve and the rear end 14 of the main body 12 of the docking fixture 10. The side port 20 desirably is disposed between the ball 16 of the isolation valve and the rear end 14 of the docking fixture 10.

As shown in FIG. 2, the side port 20 further defines a distal end 23 that is spaced apart along the transverse axis 21 from the proximate end 22 of the side port 20. As shown in FIG. 1, FIG. 2, FIG. 4, FIG. 5, FIG. 7 and FIG. 8, the side port 20 desirably defines a hollow passage 24 that elongates along the transverse axis 21. As shown in FIG. 2, the hollow passage 24 extends from the distal end 23 toward the proximal end 22. The surface defining the hollow passage 24 desirably is screw-threaded.

As shown in FIG. 4, FIG. 5, FIG. 7 and FIG. 8, the side port 20 further defines a transverse channel 25 internally of the side port 20. The proximate end of the transverse channel 25 intersects the main channel 15 so that the transverse channel 25 is always in fluid communication with the main channel 15. The transverse channel 25 elongates axially away from the proximal end 22 of the side port 20 along the transverse axis 21 to join in fluid communication with the hollow passage 24. Thus, the distal end 23 of the side port 20 can be placed in fluid communication with the HVAC system via the transverse channel 25 of the side port 20 and the main channel 15 of the main body 12 when the front end 13 of the docking fixture 10 is connected to the charging fitting of the HVAC system.

In servicing HVAC systems, it is desirable and conventional to employ a sensitive vacuum gauge. The vacuum gauge can ensure that refrigerant is not leaking from the HVAC system through the charging valve of the HVAC system. The detection of a leak might indicate that it is time to replace the valve core of the charging valve that is used to charge the HVAC system with refrigerant. Additionally, the vacuum gauge can be connected to the HVAC system to measure whether all of the refrigerant has been evacuated from the HVAC system. Accordingly, the distal end 23 of the side port 20 can be connected to a sensitive vacuum gauge (not shown herein but shown in U.S. Pat. No. 7,559,245 to Knowles et al in which the gauge 1 is connected directly to the side port as shown in FIG. 3 thereof). The vacuum gauge is sensitive enough to detect very small pressures and is used when the docking fixture is carrying out operations associated with servicing HVAC systems. Suffice it to say that it is desirable to be able to isolate this vacuum gauge from being subjected to high pressure during the afore-mentioned operations, whether this high pressure is imposed by atmospheric pressure or the high pressure under which the HVAC system refrigerant is normally maintained. The docking fixture 10 of the present invention is provided with a check valve and a slide valve, which accomplishes the desired isolation in a reliable manner that is easily manipulated with one hand of the user.

In accordance with the present invention, a proximal end of a slide valve is integrated with the distal end 23 of the side port 20, leaving a distal end of the slide valve free to be connected in communication with a sensitive vacuum gauge. The slide valve is schematically designated generally in FIG. 4 and FIG. 5 by the numeral 50. The distal end of the slide valve 50 is spaced apart from and opposite the proximal end of the slide valve 50 in the direction along the transverse axis 21 of the side port 20. The proximal end of the slide valve 50 is the end that is nearer to the main body 12. The slide valve 50 moves axially with respect to the side port 20 between open and closed positions of the slide valve 50.

As shown in FIG. 4 for example, the slide valve 50 includes the sleeve 42 and the retainer 32. As shown in FIG. 1 and FIG. 2, the retainer 32 defines a retainer body that elongates along the transverse axis 21. Because the retainer body is hollow, the retainer 32 defines an external surface and an internal surface spaced apart from the external surface in a direction that is normal to the transverse axis 21. The external surface of the retainer 32 has an externally threaded proximal end 33 that engages an internally threaded surface in the inner wall that defines the hollow passage 24 of the side port 20. However, the screw connection between the front end 33 of the retainer 32 and the threaded surface in the inner wall that defines the hollow passage 24 is not a fluid tight connection, and thus the expense of ensuring tight manufacturing tolerances can be avoided.

As shown in FIG. 4 and FIG. 5, an exit bore 27 is defined through the side port 20 and elongates along an exit axis 28 that intersects the transverse axis 21. The exit bore 27 extends completely through the side port 20 from the exterior surface of the side port 20 through the opposing interior surface of the side port 20. As shown in FIG. 4 and FIG. 5, the exit bore 27 desirably extends through the screw-threaded surface of the hollow passage 24 of the side port 20. Moreover, the exit bore 27 desirably is located near the distal end 23 of the side port 20. When the proximal end 33 of the retainer 32 is screwed into the hollow passage 24 of the side port 20, the absence of a fluid tight connection means that fluid communication is permitted between the transverse channel 25 and the exit bore 27. Thus, fluid communication likewise is permitted between the main channel 15 and the exit bore 27 via the transverse channel 25.

As shown in FIG. 1, the retainer body of the retainer 32 is further defined by a distal end 34 that is spaced apart along the transverse axis 21 from the proximal end 33 of the retainer body. A valve cavity 35 is defined axially within the interior of the distal end 34 of the retainer body. As shown in FIG. 2, the valve cavity 35 is provided with a threaded surface that is configured to receive a threaded exterior surface of a valve core 60 of a check valve, which becomes opened upon attachment of a vacuum gauge (not shown) to the distal end 34 of the retainer 32. As shown in FIG. 2, the external surface of the retainer body defines a circumferential groove 37 in an intermediate portion of the retainer 32 disposed axially between the proximal end 33 and the distal end 34 of the retainer body. The circumferential groove 37 is defined circumferentially around the exterior surface of the retainer body of the retainer 32 and is configured to retain therein, a distal seal 51 that desirably is a flexible sealing O-ring. As shown in FIG. 2, the external surface of the retainer body defines a circumferential recess 38 in a portion of the retainer 32 disposed axially between the circumferential groove 37 and the proximal end 33 of the retainer body of the retainer 32. The circumferential recess 38 is configured to retain therein, a proximal seal 52 that desirably is a flexible sealing O-ring.

Figure 7:
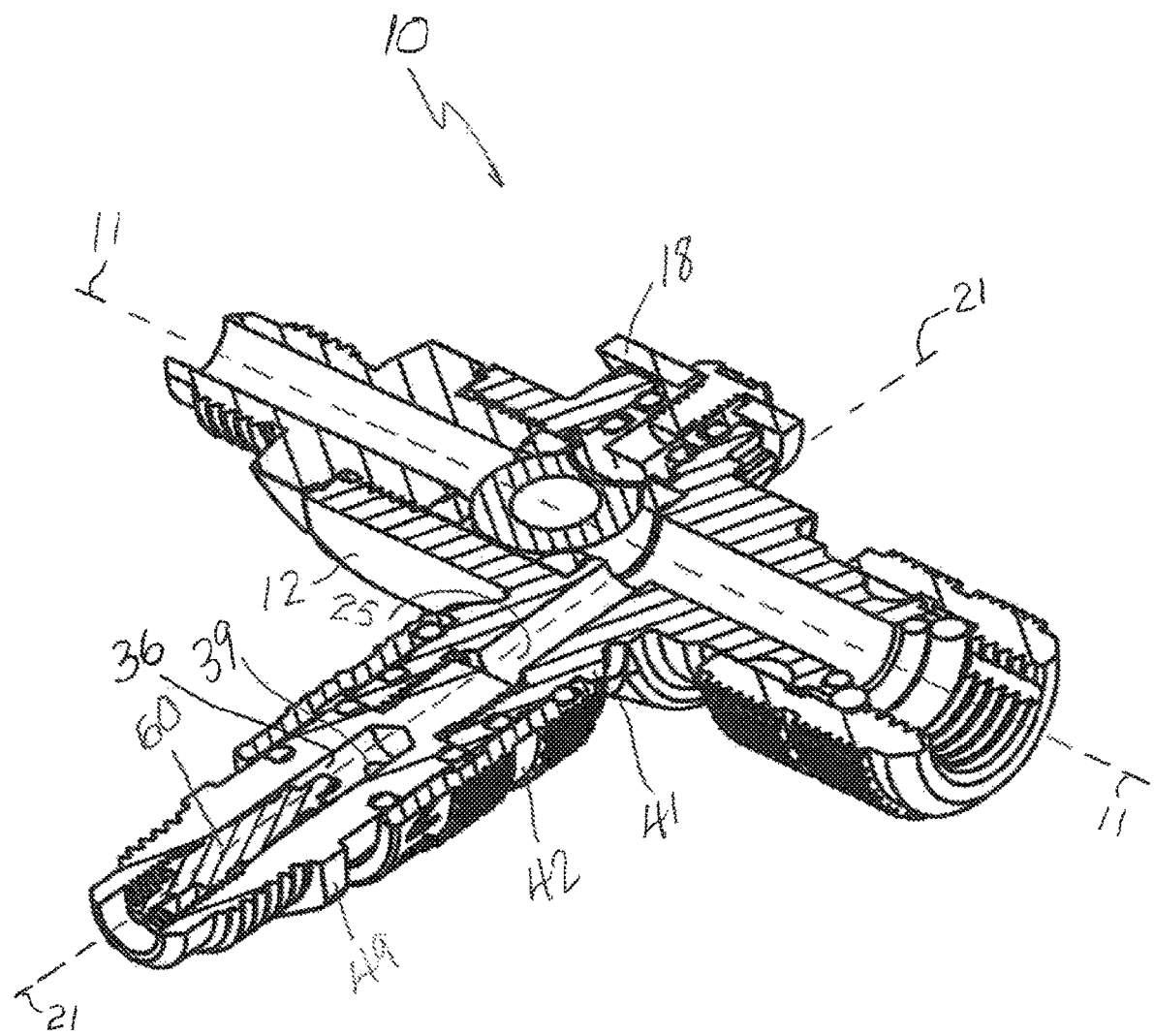
FIG. 7 is a partial perspective view and cross-sectional view taken through the docking fixture in the plane defined by the longitudinal and transverse axes.

As shown in FIG. 4 and FIG. 5, the retainer body of the retainer 32 internally defines a valve corridor 36 that elongates along the transverse axis 21 from the threaded valve cavity 35 toward the proximal end 33 of the retainer 32. As shown in FIG. 4 and FIG. 5, the retainer body defines a side bore 39 elongating along a side axis 40 that intersects the transverse axis 21. As shown in FIG. 5, FIG. 7 and FIG. 8, one opposite end of the side bore 39 opens into the valve corridor 36. As shown in FIG. 4 and FIG. 5, the other opposite end of the side bore 39 opens through the exterior surface of the retainer 32. In the embodiment shown in FIG. 4 and FIG. 5, the side axis 40 through the retainer 32 is aligned parallel to the exit axis 28 through the side port 20. However, the side axis 40 is spaced apart in the direction of the transverse axis 21 from the exit axis 28.

As shown in FIG. 2, FIG. 4 and FIG. 5, the inner surface of the sleeve 42 defines a region of indentation that defines a plenum 45. As shown in FIG. 2, with the exception of the plenum 45 and the retention groove 47 (described hereinafter), the inner surface of the sleeve 42 defines a uniform cylindrical surface 48 at a constant radius that desirably revolves completely about the transverse axis 21. The plenum 45 extends circumferentially and axially with respect to the cylindrical symmetry of the sleeve 42 about the transverse axis 21 at radii greater than the constant radius that characterizes the uniform cylindrical surface 48 in the vicinity of the plenum 45.

As shown in FIG. 2 for example, a retention groove 29 is defined in the exterior surface of the distal end 23 of the side port 20. As shown in FIG. 4 for example, the retention groove 29 is located axially adjacent the exit bore 27, but axially spaced apart from the exit bore 27 in the direction along the transverse axis 21 toward the proximal end 22 of the side port 20. The retention groove 29 in the side port 20 is configured to receive and retain therein, a port seal 54 that desirably is a flexible sealing O-ring. The port seal 54 is positioned to prevent fluid flow between the exterior surface of the side port 20 and the uniform cylindrical surface 48 of the inner surface of the sleeve 42.

Axial translation of the sleeve 42 in a closed direction causes axial movement of the sleeve 42 away from the main body 12 and toward a stop 49 defined on the exterior surface of the retainer 32 as shown in FIG. 3 and FIG. 4. The stop 49 desirably is formed by a cylindrical rim that extends radially away from the transverse axis 21 and at least partially around the circumference of the exterior surface of the retainer 32. The stop 49 desirably extends completely around the circumference of the exterior surface of the retainer 32. When the distal edge of the sleeve 42 rests against the stop 49 as shown in FIG. 3 and FIG. 4, then the slide valve 50 is oriented in the closed position. As shown in FIG. 4, the proximal seal 52 is sealing between the retainer 32 and the uniform cylindrical surface 48 of the inner surface of the sleeve 42. The proximal seal 52 is disposed between the plenum 45 of the sleeve 42 and the exit bore 27 of the side port 20. Thus, fluid flow is prevented from the exit bore 27 to the valve corridor 36 and the valve cavity 35 of the retainer 32. Fluid flow is therefore prevented from the main channel 15 via the transverse channel 25 to the valve corridor 36 and the valve cavity 35 of the retainer 32 via the exit bore 27. Accordingly, any vacuum gauge connected to the distal end 34 of the retainer 32 would be isolated from any pressure source connected to the main body 12.

Figure 11:
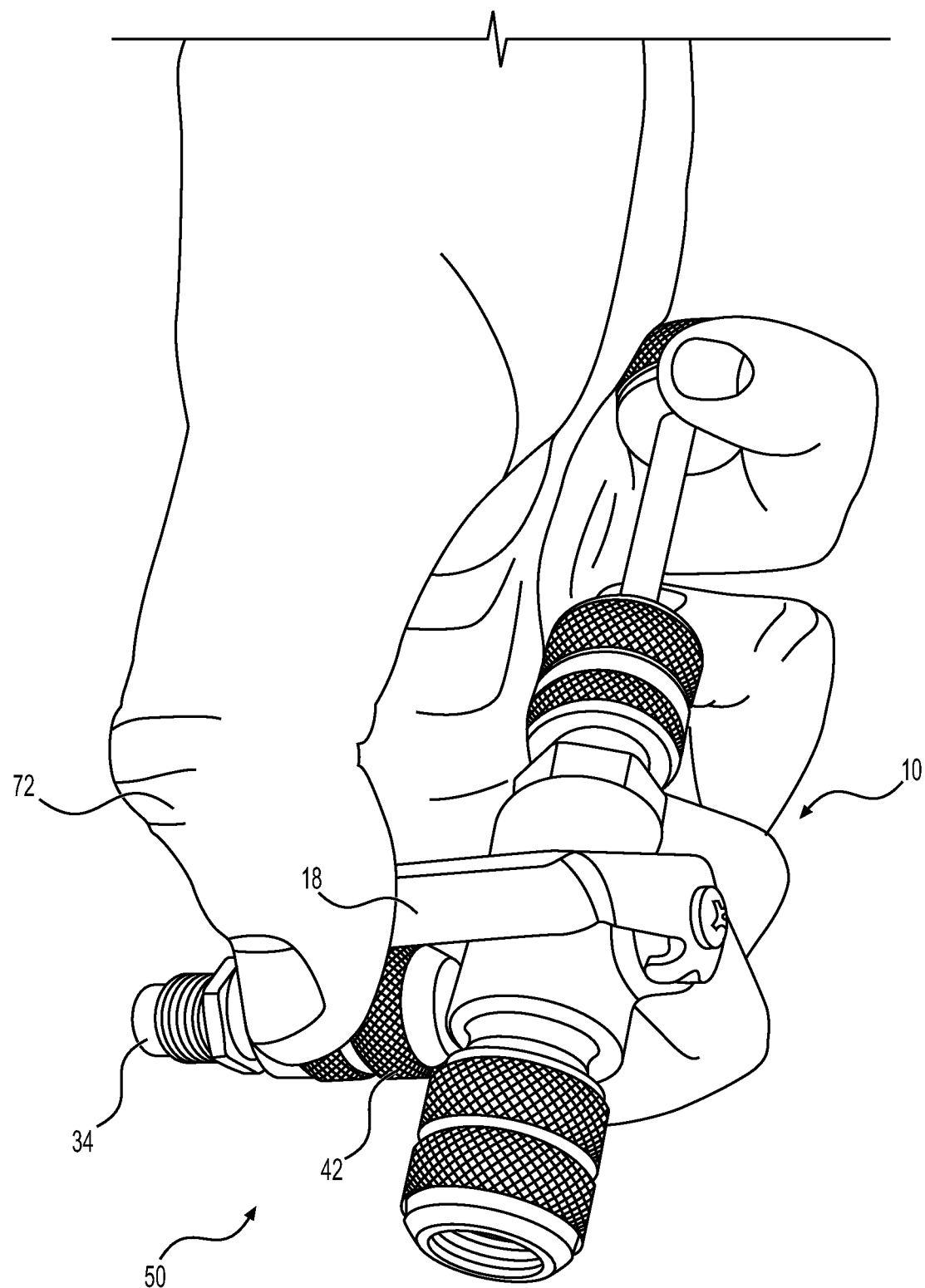
FIG. 11 is a perspective view of the one-handed manipulation of a core valve removal tool of the type in accordance with an embodiment of the present invention.

Axial translation of the sleeve 42 in an open direction indicated by the arrows on the sleeve 42 in FIG. 3 causes axial movement of the sleeve 42 toward the main body 12 and toward a stop 41. As shown in FIG. 11, the axial movement of the sleeve 42 of the slide valve 50 is easily manipulated with the thumb 72 of one hand of the user, and that same thumb 72 likewise also can move the handle 18 that opens and closes the ball valve.

Figure 9:
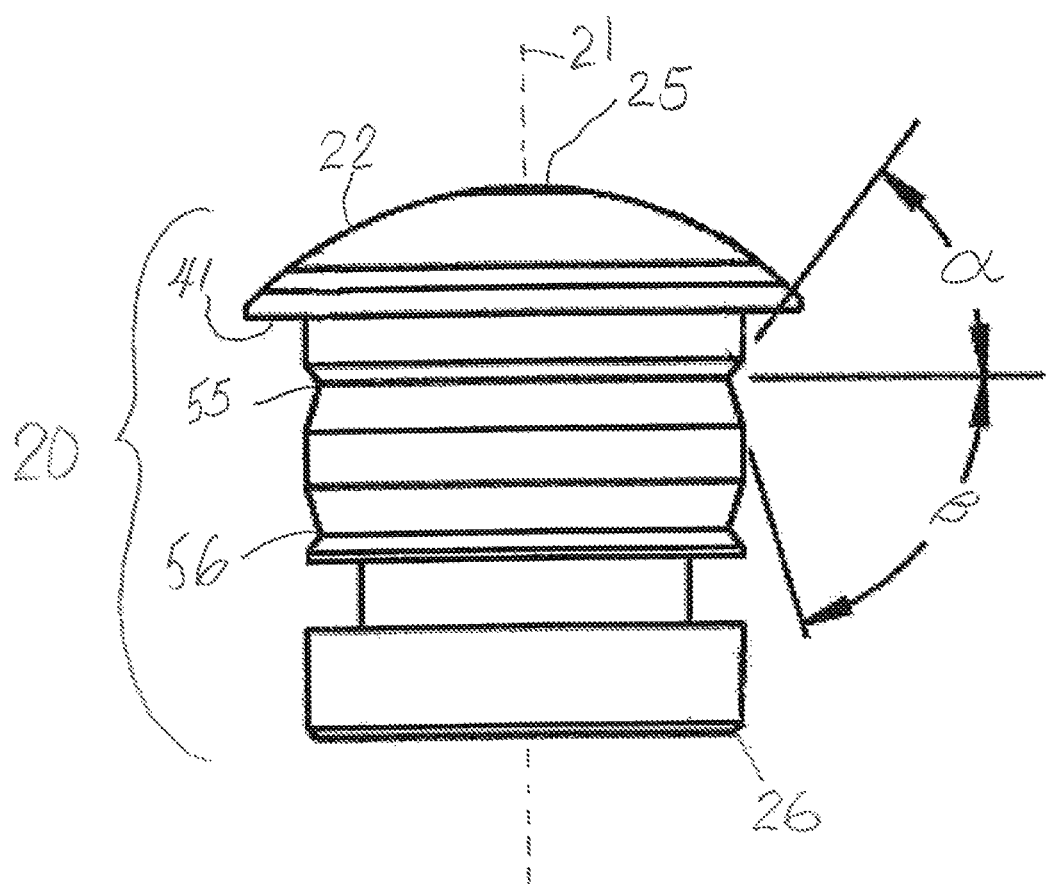
FIG. 9 is an enlarged plan view of the exterior surface of the side port of the docking fixture.
Figure 10:
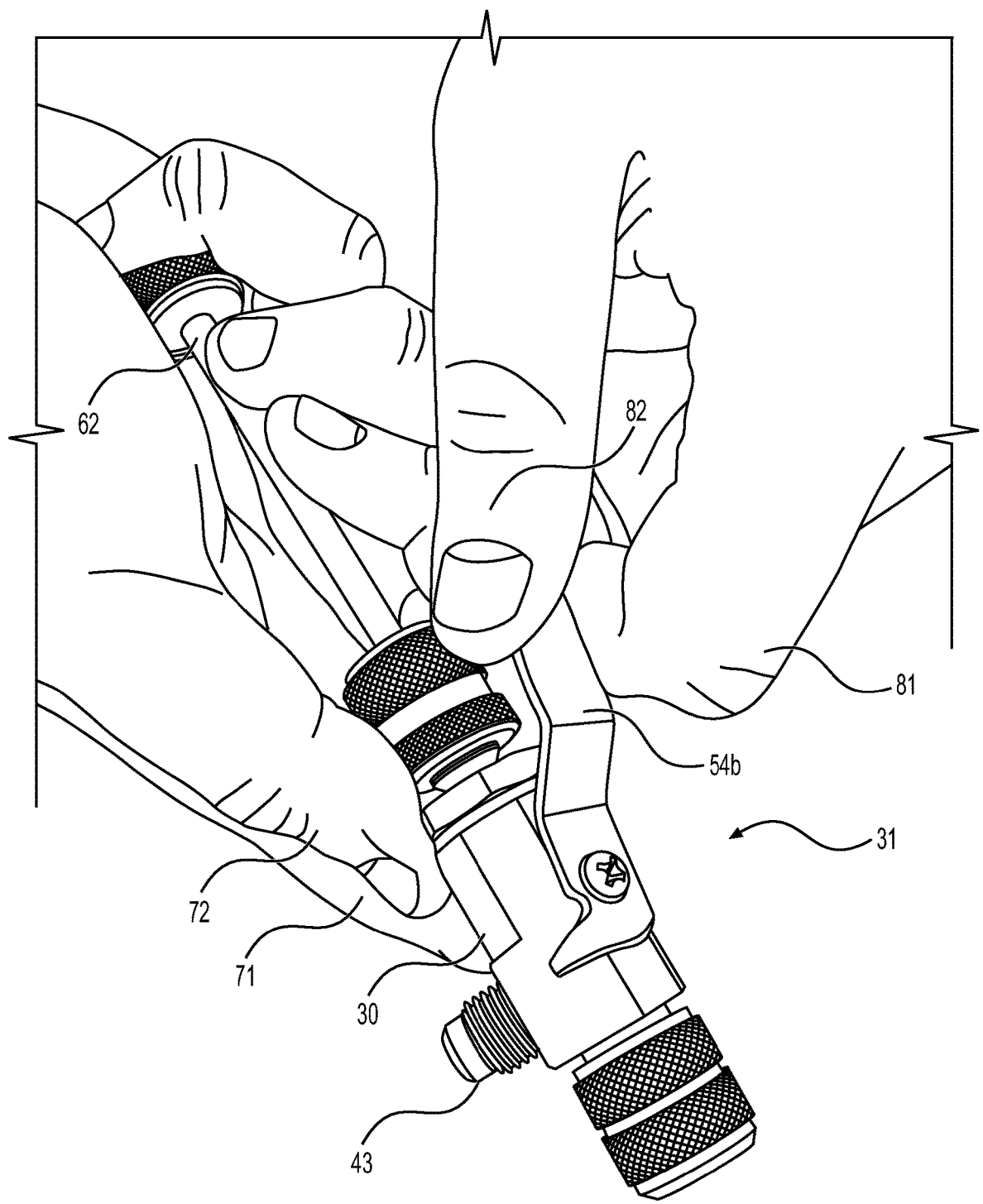
FIG. 10 is a perspective view of the two-handed manipulation of a conventional core valve removal tool of the type shown in Knowles et al.

As shown in FIG. 4, FIG. 8 and FIG. 9, the stop 41 is defined on the exterior surface of the side port 20 near the proximal end 22 of the side port 20. As shown in FIG. 9 for example, the stop 41 desirably is formed in the exterior surface of the side port 20 by an annular collar that extends radially away from the transverse axis 21. When the proximal edge of the sleeve 42 rests against the stop 41 as shown in FIG. 5, FIG. 6, FIG. 7 and FIG. 8, then the slide valve 50 is oriented in the open position. As shown in FIG. 5 and FIG. 8, the proximal seal 52 is situated coincident with the plenum 45 and thus fails to perform any sealing between the retainer 32 and the uniform cylindrical surface 48 of the inner surface of the sleeve 42. Moreover, as shown in FIG. 5, the plenum 45 of the sleeve 42 becomes situated between and connecting the exit bore 27 of the side port 20 with the side bore 39 of the retainer 32. Thus, fluid flow is permitted from the exit bore 27 to the valve corridor 36 and the valve cavity 35 of the retainer 32. Fluid flow is therefore permitted from the main channel 15 via the transverse channel 25 to the valve corridor 36 and the valve cavity 35 of the retainer 32 via the exit bore 27. Accordingly, any vacuum gauge connected to the distal end 34 of the retainer 32 would be connected to detect any pressure source connected to the main body 12 and thereby able to indicate whether the HVAC system had been sufficiently evacuated of refrigerant.

The slide valve 50 desirably is provided with a mechanism that provides to the person manipulating the sleeve 42, a tactile feedback that alerts the user when the sleeve 42 is positioned so that the slide valve 50 is in either the open position or the closed position. FIG. 9 is an enlarged plan view of the exterior surface of the side port 20, which has been depicted separate from the main body of the docking fixture 10 for the sake of simplifying the description of this tactile feedback mechanism. As shown in FIG. 9, the exterior surface of the side port 20 defines a proximal saddle 55 that is spaced apart along the transverse axis 21 from a distal saddle 56. Each respective saddle 55, 56 desirably is configured as a V-shaped groove that extends circumferentially around the exterior surface of the side port 20. As schematically shown in FIG. 9, the V-shaped groove is defined by a pair bias cuts that meet at a vertex at the exterior surface of the side port 20 to define an angle that is the sum of two angles, $\alpha$ and $\beta$. The proximal saddle 55 is located nearer to the stop 41, which as shown in FIG. 8 is disposed between the proximal saddle 55 and the main body of the docking fixture 10. The distal saddle 56 is located nearer to the retention groove 29, which is shown in FIG. 2 and FIG. 8 and is disposed between the distal saddle 56 and the free end 26 of the side port 20 of the docking fixture 10.

As shown in FIG. 2 and FIG. 4, the interior surface of the sleeve 42 at the proximal end 46 of the sleeve 42 defines a retention groove 47. As shown in FIG. 4 and FIG. 8, the retention groove 47 is configured to receive and retain therein, a tactile indicator 53 that desirably is a flexible sealing O-ring. When the slide valve 50 is oriented in the open position shown in FIG. 8 for example, then the tactile indicator 53 of the sleeve 42 is resting in the proximal saddle 55 defined in the exterior surface of the side port 20. As the user manipulates the sleeve 42 to slide the sleeve 42 toward the retainer 32 to close the slide valve 50, as can be done easily enough with the pressure applied by the user's thumb 72 alone as schematically shown in FIG. 11, then the user's thumb 72 feels the sensation of the tactile indicator 53 compressing enough to move out of the proximal saddle 55 and rub against the exterior surface of the side port 20. Once the tactile indicator 53 reaches the distal saddle 56 and resiliently expands to fall into the distal saddle 56, then the user's thumb 72 likewise detects the end of the sensation of the tactile indicator 53 rubbing against the exterior surface of the side port 20. When the tactile indicator 53 is oriented in the closed position shown in FIG. 4 for example, then the tactile indicator 53 of the sleeve 42 is resting in the distal saddle 56. Thus, the tactile feedback mechanism includes the retention groove 47 defined in inner surface of the proximal end of the sleeve 42, the tactile indicator 53 retained in the retention groove 47, the proximal saddle 55 defined in the exterior surface of the side port 20 and the distal saddle 56 defined in the exterior surface of the side port 20.

As shown in FIG. 9, the angle α is formed to the proximal side of the proximal saddle 55 and to the distal side of the distal saddle 56 and desirably measures 53°. The angle β is formed to the distal side of the proximal saddle 55 and to the proximal side of the distal saddle 56 and desirably measures 73°. Thus, the more acute angle α is disposed toward the side of the saddle 55, 56 where the tactile indicator 53 is to stop. And thus the more acute angle α is disposed closer to the respective stop 41 of the side port 20 in the case of the proximal saddle 55 or closer to the stop 49 in the retainer 32 20 in the case of the distal saddle 56.

While at least one presently preferred embodiment of the invention has been described using specific terms, such description is for illustrative purposes only, and it is to be understood that changes and variations may be made without departing from the spirit or scope of the following claims. This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal language of the claims.

What is claimed is:

1. A docking fixture for removal of a valve core from a valve fitting of a pressurized system, the docking fixture comprising:
    a main body defining a hollow main channel that elongates along a longitudinal axis;
    a side port defining a hollow passage that elongates along a transverse axis that intersects the longitudinal axis, the side port defining an exterior surface and an interior surface spaced apart from the exterior surface in a direction that is normal to the transverse axis, the side port defining a proximal end connected against the main body, the side port defining a distal end spaced apart along the transverse axis from the proximal end and defining a screw-threaded surface of the hollow passage, the side port defining an exit bore elongating along an exit axis that intersects the transverse axis, the exit bore extending from the exterior surface to the interior surface and through the screw-threaded surface;
    a retainer defining a retainer body that elongates along the transverse axis, the retainer body defining an external surface and an internal surface spaced apart from the external surface in a direction that is normal to the transverse axis, the retainer body having a proximal end connected against the screw-threaded surface of the hollow passage of the side port, the retainer body having a distal end spaced apart along the transverse axis from the proximal end of the retainer body and defining a valve cavity configured to receive a valve core, the proximal end of the retainer body defining a side bore elongating along a side axis that intersects the transverse axis and through the screw-threaded surface;
    a valve core received in the valve cavity of the retainer body;
    a sleeve defining an inner surface defining a uniform cylindrical surface extending along the transverse axis between a proximal end of the sleeve and a distal end of the sleeve, the proximal end of the sleeve being slidably mounted against the distal end of the side port, the distal end of the sleeve being slidably mounted against the distal end of the retainer body, the inner surface of the sleeve defining a region of indentation that defines a plenum, wherein the plenum connects the exit bore and the side bore in an open disposition of the sleeve, wherein the plenum fails to connect the exit bore and the side bore in a closed disposition of the sleeve.

2. The docking fixture of claim 1, wherein the connection between the proximal end of the retainer body against the screw-threaded surface of the hollow passage of the side port is not gas tight.

3. The docking fixture of claim 1, wherein the exterior surface of the side port defines a proximal stop that prevents the sleeve from sliding past the proximal stop.

4. The docking fixture of claim 3, wherein the sleeve is disposed in the open disposition when the sleeve is contacting the proximal stop.

5. The docking fixture of claim 1, wherein the external surface of the retainer defines a distal stop that prevents the sleeve from sliding past the distal stop.

6. The docking fixture of claim 5, wherein the sleeve is disposed in the closed disposition when the sleeve is contacting the distal stop.

7. The docking fixture of claim 1, further comprising a tactile feedback mechanism, wherein the tactile feedback mechanism is configured to provide tactile sensation when the sleeve is positioned in one of the open position and the closed position.

8. The docking fixture of claim 7, wherein the tactile feedback mechanism includes a retention groove defined in inner surface of the proximal end of the sleeve, a tactile indicator retained in the retention groove, a proximal saddle defined in the exterior surface of the side port, and a distal saddle defined in the exterior surface of the side port and spaced apart along the transverse axis from the proximal saddle.

9. A core removal assembly for selectively installing and removing a valve core from a valve installed in a pressurized system, the core removal assembly comprising:
    a main body defining a hollow main channel that elongates along a longitudinal axis;
    a side port defining a hollow passage that elongates along a transverse axis that intersects the longitudinal axis, the side port defining an exterior surface and an interior surface spaced apart from the exterior surface in a direction that is normal to the transverse axis, the side port defining a proximal end connected against the main body, the side port defining a distal end spaced apart along the transverse axis from the proximal end and defining a screw-threaded surface of the hollow passage, the side port defining an exit bore elongating along an exit axis that intersects the transverse axis, the exit bore extending from the exterior surface to the interior surface and through the screw-threaded surface;

a retainer defining a retainer body that elongates along the transverse axis, the retainer body defining an external surface and an internal surface spaced apart from the external surface in a direction that is normal to the transverse axis, the retainer body having a proximal end connected against the screw-threaded surface of the hollow passage of the side port, the retainer body having a distal end spaced apart along the transverse axis from the proximal end of the retainer body and defining a valve cavity configured to receive a valve core, the proximal end of the retainer body defining a side bore elongating along a side axis that intersects the transverse axis and through the screw-threaded surface;

a valve core received in the valve cavity of the retainer body;

a sleeve defining an inner surface defining a uniform cylindrical surface extending along the transverse axis between a proximal end of the sleeve and a distal end of the sleeve, the proximal end of the sleeve being slidably mounted against the distal end of the side port, the distal end of the sleeve being slidably mounted against the distal end of the retainer body, the inner surface of the sleeve defining a region of indentation that defines a plenum, wherein the plenum connects the exit bore and the side bore in an open disposition of the sleeve, wherein the plenum fails to connect the exit bore and the side bore in a closed disposition of the sleeve.

10. The docking fixture of claim 9, wherein the connection between the proximal end of the retainer body against the screw-threaded surface of the hollow passage of the side port is not gas tight.

11. The docking fixture of claim 9, wherein the exterior surface of the side port defines a proximal stop that prevents the sleeve from sliding past the proximal stop.

12. The docking fixture of claim 11, wherein the sleeve is disposed in the open disposition when the sleeve is contacting the proximal stop.

13. The docking fixture of claim 9, wherein the external surface of the retainer defines a distal stop that prevents the sleeve from sliding past the distal stop.

14. The docking fixture of claim 13, wherein the sleeve is disposed in the closed disposition when the sleeve is contacting the distal stop.

15. The docking fixture of claim 9, further comprising a tactile feedback mechanism, wherein the tactile feedback mechanism is configured to provide tactile sensation when the sleeve is positioned in one of the open position and the closed position.

16. The docking fixture of claim 15, wherein the tactile feedback mechanism includes a retention groove defined in inner surface of the proximal end of the sleeve, a tactile indicator retained in the retention groove, a proximal saddle defined in the exterior surface of the side port, and a distal saddle defined in the exterior surface of the side port and spaced apart along the transverse axis from the proximal saddle.

* * * * *